United States Patent
Schena et al.

(10) Patent No.: US 11,120,392 B2
(45) Date of Patent: Sep. 14, 2021

(54) SYSTEM AND METHOD OF CALIBRATING A DIRECTIONAL LIGHT SOURCE RELATIVE TO A CAMERA'S FIELD OF VIEW

(71) Applicant: Position Imaging, Inc., Portsmouth, NH (US)

(72) Inventors: Drew Anthony Schena, Portsmouth, NH (US); Guohua Min, Exeter, NH (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

(21) Appl. No.: 16/437,767

(22) Filed: Jun. 11, 2019

(65) Prior Publication Data

US 2019/0295290 A1    Sep. 26, 2019

Related U.S. Application Data

(60) Provisional application No. 62/684,054, filed on Jun. 12, 2018.

(51) Int. Cl.
| | |
|---|---|
| *G06T 7/00* | (2017.01) |
| *H04N 5/217* | (2011.01) |
| *G06Q 10/08* | (2012.01) |
| *G06T 7/586* | (2017.01) |
| *G06T 7/80* | (2017.01) |
| *G06T 7/73* | (2017.01) |
| *G06T 7/593* | (2017.01) |

(52) U.S. Cl.
CPC ..... *G06Q 10/0833* (2013.01); *G06Q 10/0832* (2013.01); *G06Q 10/0835* (2013.01); *G06Q 10/0836* (2013.01); *G06Q 10/0838* (2013.01); *G06Q 10/0875* (2013.01); *G06T 7/0004* (2013.01); *G06T 7/586* (2017.01); *G06T 7/593* (2017.01); *G06T 7/73* (2017.01); *G06T 7/80* (2017.01); *H04N 5/2178* (2013.01); *G06T 2207/30204* (2013.01)

(58) Field of Classification Search
CPC ........... G06Q 10/0833; G06Q 10/0832; G06Q 10/0835; G06Q 10/0836; G06Q 10/0838; G06Q 10/0875; G06T 7/586; G06T 7/80; G06T 7/73; G06T 7/593; G06T 7/0004; G06T 2207/30204; H04N 5/2178
USPC ........................................... 348/187; 345/633
See application file for complete search history.

(56) References Cited

U.S. PATENT DOCUMENTS

| | | |
|---|---|---|
| 2,408,122 A | 9/1946 | Wirkler |
| 3,824,596 A | 7/1974 | Guion et al. |
| 3,940,700 A | 2/1976 | Fischer |
| 4,018,029 A | 4/1977 | Safranski et al. |
| 4,328,499 A | 5/1982 | Anderson et al. |
| 4,570,416 A | 2/1986 | Shoenfeld |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,545,880 A | 8/1996 | Bu et al. |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,285,916 B1 | 9/2001 | Kadaba et al. |
| 6,292,750 B1 | 9/2001 | Lin |
| 6,409,687 B1 | 6/2002 | Foxlin |
| 6,417,802 B1 | 7/2002 | Diesel |
| 6,492,905 B2 | 12/2002 | Mathias et al. |
| 6,496,778 B1 | 12/2002 | Lin |
| 6,512,748 B1 | 1/2003 | Mizuki et al. |
| 6,593,885 B2 | 7/2003 | Wisherd et al. |
| 6,619,550 B1 | 9/2003 | Good et al. |

(Continued)

FOREIGN PATENT DOCUMENTS

| | | |
|---|---|---|
| DE | 102017205958 A1 | 10/2018 |
| WO | 2001006401 A1 | 1/2001 |
| WO | 2005010550 A1 | 2/2005 |
| WO | 2009007198 A1 | 1/2009 |
| WO | 2020061276 A1 | 3/2020 |

OTHER PUBLICATIONS

Hill, et al. "Package Tracking Systems and Methods" U.S. Appl. No. 15/091,180, filed Apr. 5 2016.

(Continued)

*Primary Examiner* — John W Miller
*Assistant Examiner* — Omer Khalid
(74) *Attorney, Agent, or Firm* — Schmeiser, Olsen & Watts LLP

(57) ABSTRACT

A system and method for calibrating location and orientation of a directional light source relative to a field of view of an optical device includes a directional light source that directs light to points on a virtual grid overlaying the field of view of the optical device. The optical device captures an image for each point on the virtual grid at which the directional light source directs light. A light dot is located in a plurality of captured images. The location and orientation of the directional light source are calibrated relative to the field of view of the optical device based on coordinates of each located light dot and on relative coordinates of the optical device.

23 Claims, 8 Drawing Sheets

(56) References Cited

U.S. PATENT DOCUMENTS

| | | |
|---|---|---|
| 6,630,904 B2 | 10/2003 | Gustafson et al. |
| 6,634,804 B1 | 10/2003 | Toste et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,988,079 B1 | 1/2006 | Or-Bach et al. |
| 6,989,789 B2 | 1/2006 | Ferreol et al. |
| 7,009,561 B2 | 3/2006 | Menache et al. |
| 7,104,453 B1 | 9/2006 | Zhu et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,353,994 B2 | 4/2008 | Farrall et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,689,465 B1 | 3/2010 | Shakes et al. |
| 7,844,507 B2 | 11/2010 | Levy |
| 7,868,760 B2 | 1/2011 | Smith et al. |
| 7,876,268 B2 | 1/2011 | Jacobs |
| 7,933,730 B2 | 4/2011 | Li et al. |
| 8,009,918 B2 | 8/2011 | Van Droogenbroeck et al. |
| 8,189,855 B2 | 5/2012 | Opalach et al. |
| 8,201,737 B1 | 6/2012 | Palacios Durazo et al. |
| 8,219,438 B1 | 7/2012 | Moon et al. |
| 8,269,624 B2 | 9/2012 | Chen et al. |
| 8,295,542 B2 | 10/2012 | Albertson et al. |
| 8,406,470 B2 | 3/2013 | Jones et al. |
| 8,457,655 B2 | 6/2013 | Zhang et al. |
| 8,619,144 B1 | 12/2013 | Chang et al. |
| 8,749,433 B2 | 6/2014 | Hill |
| 8,843,231 B2 | 9/2014 | Ragusa et al. |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,171,278 B1 | 10/2015 | Kong et al. |
| 9,174,746 B1 | 11/2015 | Bell et al. |
| 9,269,022 B2 | 2/2016 | Rhoads et al. |
| 9,349,076 B1 | 5/2016 | Liu et al. |
| 9,424,493 B2 | 8/2016 | He et al. |
| 9,482,741 B1 | 11/2016 | Min et al. |
| 9,497,728 B2 | 11/2016 | Hill |
| 9,500,396 B2 | 11/2016 | Yoon et al. |
| 9,514,389 B1 | 12/2016 | Erhan et al. |
| 9,519,344 B1 | 12/2016 | Hill |
| 9,544,552 B2 | 1/2017 | Takahashi |
| 9,594,983 B2 | 3/2017 | Alattar et al. |
| 9,656,749 B1 | 5/2017 | Hanlon |
| 9,740,937 B2 | 8/2017 | Zhang et al. |
| 9,782,669 B1 | 10/2017 | Hill |
| 9,872,151 B1 | 1/2018 | Puzanov et al. |
| 9,904,867 B2 | 2/2018 | Fathi et al. |
| 9,933,509 B2 | 4/2018 | Hill et al. |
| 9,961,503 B2 | 5/2018 | Hill |
| 9,996,818 B1 | 6/2018 | Ren et al. |
| 10,001,833 B2 | 6/2018 | Hill |
| 10,148,918 B1 | 12/2018 | Seiger et al. |
| 10,163,149 B1 | 12/2018 | Famularo et al. |
| 10,180,490 B1 | 1/2019 | Schneider et al. |
| 10,257,654 B2 | 4/2019 | Hill |
| 10,324,474 B2 | 6/2019 | Hill et al. |
| 10,332,066 B1 | 6/2019 | Palaniappan et al. |
| 10,373,322 B1 | 8/2019 | Buibas et al. |
| 10,399,778 B1 | 9/2019 | Shekhawat et al. |
| 10,416,276 B2 | 9/2019 | Hill et al. |
| 10,444,323 B2 | 10/2019 | Min et al. |
| 10,455,364 B2 | 10/2019 | Hill |
| 10,605,904 B2 | 3/2020 | Min et al. |
| 2001/0027995 A1 | 10/2001 | Patel et al. |
| 2002/0021277 A1 | 2/2002 | Kramer et al. |
| 2002/0095353 A1 | 7/2002 | Razumov |
| 2002/0140745 A1 | 10/2002 | Ellenby et al. |
| 2002/0177476 A1 | 11/2002 | Chou |
| 2003/0024987 A1 | 2/2003 | Zhu |
| 2003/0053492 A1 | 3/2003 | Matsunaga |
| 2003/0110152 A1 | 6/2003 | Hara |
| 2003/0115162 A1 | 6/2003 | Konick |
| 2003/0120425 A1 | 6/2003 | Stanley et al. |
| 2003/0176196 A1 | 9/2003 | Hall et al. |
| 2003/0184649 A1 | 10/2003 | Mann |
| 2003/0195017 A1 | 10/2003 | Chen et al. |
| 2004/0002642 A1 | 1/2004 | Dekel et al. |
| 2004/0095907 A1 | 5/2004 | Agee et al. |
| 2004/0107072 A1 | 6/2004 | Dietrich et al. |
| 2004/0176102 A1 | 9/2004 | Lawrence et al. |
| 2004/0203846 A1 | 10/2004 | Caronni et al. |
| 2004/0267640 A1 | 12/2004 | Bong et al. |
| 2005/0001712 A1 | 1/2005 | Yarbrough |
| 2005/0057647 A1 | 3/2005 | Nowak |
| 2005/0062849 A1 | 3/2005 | Foth et al. |
| 2005/0074162 A1* | 4/2005 | Tu ............... G06T 7/593 |
| | | 382/154 |
| 2005/0143916 A1 | 6/2005 | Kim et al. |
| 2005/0154685 A1 | 7/2005 | Mundy et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2007/0237356 A1 | 10/2007 | Dwinell et al. |
| 2008/0007398 A1 | 1/2008 | DeRose et al. |
| 2008/0035390 A1 | 2/2008 | Wurz |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0156619 A1 | 7/2008 | Patel et al. |
| 2008/0174485 A1 | 7/2008 | Carani et al. |
| 2008/0183328 A1 | 7/2008 | Danelski |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0073428 A1 | 3/2009 | Magnus et al. |
| 2009/0114575 A1 | 5/2009 | Carpenter et al. |
| 2009/0121017 A1 | 5/2009 | Cato et al. |
| 2009/0149202 A1 | 6/2009 | Hill et al. |
| 2009/0224040 A1 | 9/2009 | Kushida et al. |
| 2009/0243932 A1 | 10/2009 | Moshfeghi |
| 2009/0323586 A1 | 12/2009 | Hohl et al. |
| 2010/0019905 A1 | 1/2010 | Boddie et al. |
| 2010/0076594 A1 | 3/2010 | Salour et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |

(56) References Cited

U.S. PATENT DOCUMENTS

| | | |
|---|---|---|
| 2010/0123664 A1 | 5/2010 | Shin et al. |
| 2010/0159958 A1 | 6/2010 | Naguib et al. |
| 2011/0002509 A1 | 1/2011 | Nobori et al. |
| 2011/0006774 A1 | 1/2011 | Baiden |
| 2011/0037573 A1 | 2/2011 | Choi |
| 2011/0066086 A1 | 3/2011 | Aarestad et al. |
| 2011/0166694 A1 | 7/2011 | Griffits et al. |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2011/0286633 A1 | 11/2011 | Wang et al. |
| 2011/0313893 A1 | 12/2011 | Weik, III |
| 2011/0315770 A1 | 12/2011 | Patel et al. |
| 2012/0013509 A1 | 1/2012 | Wisherd et al. |
| 2012/0020518 A1 | 1/2012 | Taguchi |
| 2012/0081544 A1 | 4/2012 | Wee |
| 2012/0087572 A1 | 4/2012 | Dedeoglu et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0257061 A1 | 10/2012 | Edwards et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0051624 A1 | 2/2013 | Iwasaki et al. |
| 2013/0063567 A1 | 3/2013 | Burns et al. |
| 2013/0073093 A1 | 3/2013 | Songkakul |
| 2013/0113993 A1 | 5/2013 | Dagit, III |
| 2013/0182114 A1* | 7/2013 | Zhang .............. A61B 5/0046 348/150 |
| 2013/0191193 A1 | 7/2013 | Calman et al. |
| 2013/0226655 A1 | 8/2013 | Shaw |
| 2013/0281084 A1 | 10/2013 | Batada et al. |
| 2013/0293684 A1 | 11/2013 | Becker et al. |
| 2013/0293722 A1 | 11/2013 | Chen |
| 2013/0314210 A1 | 11/2013 | Schoner et al. |
| 2013/0335318 A1 | 12/2013 | Nagel et al. |
| 2013/0335415 A1 | 12/2013 | Chang |
| 2014/0022058 A1 | 1/2014 | Striemer et al. |
| 2014/0108136 A1 | 4/2014 | Zhao et al. |
| 2014/0139426 A1 | 5/2014 | Kryze et al. |
| 2014/0253368 A1 | 9/2014 | Holder |
| 2014/0270356 A1 | 9/2014 | Dearing et al. |
| 2014/0300516 A1 | 10/2014 | Min et al. |
| 2014/0317005 A1 | 10/2014 | Balwani |
| 2014/0330603 A1 | 11/2014 | Corder et al. |
| 2014/0357295 A1 | 12/2014 | Skomra et al. |
| 2014/0361078 A1 | 12/2014 | Davidson |
| 2015/0009949 A1 | 1/2015 | Khoryaev et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0055821 A1 | 2/2015 | Fotland |
| 2015/0059374 A1 | 3/2015 | Hebel |
| 2015/0085096 A1 | 3/2015 | Smits |
| 2015/0091757 A1 | 4/2015 | Shaw et al. |
| 2015/0130664 A1 | 5/2015 | Hill et al. |
| 2015/0133162 A1 | 5/2015 | Meredith et al. |
| 2015/0134418 A1 | 5/2015 | Leow et al. |
| 2015/0169916 A1 | 6/2015 | Hill et al. |
| 2015/0170002 A1 | 6/2015 | Szegedy et al. |
| 2015/0202770 A1* | 7/2015 | Patron .............. G06Q 20/386 700/245 |
| 2015/0210199 A1 | 7/2015 | Payne |
| 2015/0221135 A1 | 8/2015 | Hill et al. |
| 2015/0227890 A1 | 8/2015 | Bednarek et al. |
| 2015/0248765 A1 | 9/2015 | Criminisi et al. |
| 2015/0254906 A1 | 9/2015 | Berger et al. |
| 2015/0278759 A1 | 10/2015 | Harris et al. |
| 2015/0310539 A1* | 10/2015 | McCoy .............. G06Q 30/0623 705/27.1 |
| 2015/0323643 A1 | 11/2015 | Hill et al. |
| 2015/0341551 A1 | 11/2015 | Perrin et al. |
| 2015/0362581 A1 | 12/2015 | Friedman et al. |
| 2015/0371178 A1 | 12/2015 | Abhyanker et al. |
| 2015/0371319 A1 | 12/2015 | Argue et al. |
| 2015/0379366 A1 | 12/2015 | Nomura et al. |
| 2016/0035078 A1 | 2/2016 | Lin et al. |
| 2016/0063610 A1 | 3/2016 | Argue et al. |
| 2016/0093184 A1 | 3/2016 | Locke et al. |
| 2016/0098679 A1 | 4/2016 | Levy |
| 2016/0140436 A1 | 5/2016 | Yin et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0195602 A1 | 7/2016 | Meadow |
| 2016/0232857 A1* | 8/2016 | Tamaru .............. H04N 5/57 |
| 2016/0238692 A1 | 8/2016 | Hill et al. |
| 2016/0248969 A1 | 8/2016 | Hurd |
| 2016/0256100 A1 | 9/2016 | Jacofsky et al. |
| 2016/0286508 A1 | 9/2016 | Khoryaev et al. |
| 2016/0300187 A1 | 10/2016 | Kashi et al. |
| 2016/0335593 A1 | 11/2016 | Clarke et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0066597 A1 | 3/2017 | Hiroi |
| 2017/0117233 A1 | 4/2017 | Anayama et al. |
| 2017/0123426 A1 | 5/2017 | Hill et al. |
| 2017/0140329 A1 | 5/2017 | Bernhardt et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0293885 A1 | 10/2017 | Grady et al. |
| 2017/0313514 A1 | 11/2017 | Lert, Jr. et al. |
| 2017/0323174 A1 | 11/2017 | Joshi et al. |
| 2017/0323376 A1 | 11/2017 | Glaser et al. |
| 2017/0350961 A1 | 12/2017 | Hill et al. |
| 2017/0351255 A1 | 12/2017 | Anderson et al. |
| 2017/0359573 A1* | 12/2017 | Kim .............. H04N 5/2256 |
| 2017/0372524 A1 | 12/2017 | Hill |
| 2017/0374261 A1 | 12/2017 | Teich et al. |
| 2018/0003962 A1* | 1/2018 | Urey .............. G02B 27/0093 |
| 2018/0033151 A1 | 2/2018 | Matsumoto et al. |
| 2018/0068100 A1 | 3/2018 | Seo |
| 2018/0068266 A1 | 3/2018 | Kirmani et al. |
| 2018/0094936 A1 | 4/2018 | Jones et al. |
| 2018/0108134 A1 | 4/2018 | Venable et al. |
| 2018/0139431 A1 | 5/2018 | Simek et al. |
| 2018/0164103 A1 | 6/2018 | Hill |
| 2018/0197139 A1 | 7/2018 | Hill |
| 2018/0197218 A1 | 7/2018 | Mallesan et al. |
| 2018/0231649 A1 | 8/2018 | Min et al. |
| 2018/0242111 A1 | 8/2018 | Hill |
| 2018/0339720 A1 | 11/2018 | Singh |
| 2019/0029277 A1 | 1/2019 | Skr Dderdal et al. |
| 2019/0053012 A1 | 2/2019 | Hill |
| 2019/0073785 A1 | 3/2019 | Hafner et al. |
| 2019/0090744 A1 | 3/2019 | Mahfouz |
| 2019/0098263 A1 | 3/2019 | Seiger et al. |
| 2019/0138849 A1 | 5/2019 | Zhang |
| 2019/0295290 A1 | 9/2019 | Schena et al. |
| 2019/0394448 A1 | 12/2019 | Ziegler et al. |
| 2020/0005116 A1 | 1/2020 | Kuo |
| 2020/0011961 A1 | 1/2020 | Hill et al. |
| 2020/0012894 A1 | 1/2020 | Lee |
| 2020/0097724 A1 | 3/2020 | Chakravarty et al. |

OTHER PUBLICATIONS

Hill, et al. "Video for Real-Time Confirmation in Package Tracking Systems" U.S. Appl. No. 15/416,366, filed Jan. 26, 2017.

(56) References Cited

OTHER PUBLICATIONS

Piotrowski, et al. "Light-Based Guidance for Package Tracking Systems" U.S. Appl. No. 15/416,379, filed Jan. 26, 2017.
Brown, Matthew and David G. Lowe "Automatic Panoramic Image Stitching using Invariant Features," International Journal of Computer Vision, vol. 74, No. 1, pp. 59-73, 2007.
Szeliski, Richard "Image Alignment and Stitching: A Tutorial,:" Technical Report, MST-TR-2004-92, Dec. 10, 2006.
Xu, Wei and Jane Mulligan "Performance Evaluation of Color Correction Approaches for Automatic Multi-view Image and Video Stitching," International Converence on Computer Vision and Pattern Recognition (CVPR10), San Francisco, CA, 2010.
Final Office Action in U.S. Appl. No. 15/259,474 dated Jan. 10, 2020; 19 pages.
Final Office Action in U.S. Appl. No. 16/206,745 dated Feb. 5, 2020; 15 pages.
Non-Final Office Action in U.S. Appl. No. 16/206,745 dated Oct. 18, 2019; 8 pages.
Final Office Action in U.S. Appl. No. 15/416,366 dated Oct. 7, 2019; 14 pages.
Non-Final Office Action in U.S. Appl. No. 15/416,366 dated Apr. 6, 2020; 13 pages.
Final Office Action in U.S. Appl. No. 15/416,379 dated Jan. 27, 2020; 15 pages.
Non-Final Office Action in U.S. Appl. No. 15/416,379, dated Jun. 27, 2019; 12 pages.
Non-Final Office Action in U.S. Appl. No. 15/861,414 dated Apr. 6, 2020; 14 pages.
Morbella N50: 5-inch GPS Navigator User's Manual, Maka Technologies Group, May 2012.
Final Office Action in U.S. Appl. No. 16/206,745 dated May 22, 2019; 9 pages.
Non-Final Office Action in U.S. Appl. No. 16/206,745 dated Jan. 7, 2019; 10 pages.
Non-Final Office Action in U.S. Appl. No. 15/416,366 dated Jun. 13, 2019; 11 pages.
Non-Final Office Action in U.S. Appl. No. 15/259,474 dated May 29, 2019; 19 pages.
Wilde, Andreas, "Extended Tracking Range Delay-Locked Loop," Proceedings IEEE International Conference on Communications, Jun. 1995, pp. 1051-1054.
Notice of Allowance in U.S. Appl. No. 15/270,749 dated Oct. 4, 2018; 5 pages.
Li, et al. "Multifrequency-Based Range Estimation of RFID Tags," IEEE International Conference on RFID, 2009.
Welch, Greg and Gary Bishop, "An Introduction to the Kalman Filter," Department of Computer Science, University of North Carolina at Chapel Hill, Chapel Hill, NC 27599-3175, Updated: Monday, Jul. 24, 2006.
Non-Final Office Action in U.S. Appl. No. 15/270,749 dated Apr. 4, 2018; 8 pages.
"ADXL202/ADXL210 Product Sheet," Analog.com, 1999.
Farrell & Barth, "The Global Positiong System & Interial Navigation", 1999, McGraw-Hill; pp. 245-252.
Pourhomayoun, Mohammad and Mark Fowler, "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.
Schmidt & Phillips, "INS/GPS Integration Architectures", NATO RTO Lecture Seriers, First Presented Oct. 20-21, 2003.
Grewal & Andrews, "Global Positioning Systems, Inertial Nagivation, and Integration", 2001, John Weiley and Sons, pp. 252-256.
Jianchen Gao, "Development of a Precise GPS/INS/On-Board Vehicle Sensors Integrated Vehicular Positioning System", Jun. 2007, UCGE Reports No. 20555.
Yong Yang, "Tightly Coupled MEMS INS/GPS Integration with INS Aided Receiver Tracking Loops", Jun. 2008, UCGE Reports No. 20270.
Goodall, Christopher L., "Improving Usability of Low-Cost INS/GPS Navigation Systems using Intelligent Techniques", Jan. 2009, UCGE Reports No. 20276.
Debo Sun, "Ultra-Tight GPS/Reduced IMU for Land Vehicle Navigation", Mar. 2010, UCGE Reports No. 20305.
Adrian Schumacher, "Integration of a GPS aised Strapdown Inertial Navigation System for Land Vehicles", Master of Science Thesis, KTH Electrical Engineering, 2006.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.
Jennifer Denise Gautier, "GPS/INS Generalized Evaluation Tool (GIGET) for the Design and Testing of Integrated Navigation Systems", Dissertation, Stanford University, Jun. 2003.
Vikas Numar N., "Integration of Inertial Navigation System and Global Positioning System Using Kalman Filtering", M.Tech Dissertation, Indian Institute of Technology, Bombay, Mumbai, Jul. 2004.
Farrell, et al., "Real-Time Differential Carrier Phase GPS=Aided INS", Jul. 2000, IEEE Transactions on Control Systems Technology, vol. 8, No. 4.
Filho, et al., "Integrated GPS/INS Navigation System Based on a Gyrpscope-Free IMU", DINCON Brazilian Conference on Synamics, Control, and Their Applications, May 22-26, 2006.
Santiago Alban, "Design and Performance of a Robust GPS/INS Attitude System for Automobile Applications", Dissertation, Stanford University, Jun. 2004.
Proakis, John G. and Masoud Salehi, "Communication Systems Engineering", Second Edition, Prentice-Hall, Inc., Upper Saddle River, New Jersey, 2002.
International Search Report & Written Opinion in international patent application PCT/US12/64860, dated Feb. 28, 2013; 8 pages.
Non-Final Office Action in U.S. Appl. No. 15/091,180, dated Jun. 27, 2019; 11 pages.
Restriction Requirement in U.S. Appl. No. 15/091,180 dated Mar. 19, 2019; 8 pages.
Dictionary Definition for Peripheral Equipment. (2001). Hargrave's Communications Dictionary, Wiley. Hoboken, NJ: Wiley. Retrieved from Https://search.credorefernce.com/content/entry/hargravecomms/peripheral_equioment/0 (Year:2001).
Final Office Action in U.S. Appl. No. 15/091,180 dated Jan. 23, 2020; 17 pages.
Corrected Notice of Allowability in U.S. Appl. No. 15/270,749 dated Oct. 30, 2018; 5 pages.
International Search Report and Written Opinion in PCT/US2019/051874 dated Dec. 13, 2020; 9 pages.
International Search Report and Written Opinion in PCT/US2020/013280 dated Mar. 10, 2020; 9 pages.
Notice of Allowance in U.S. Appl. No. 15/416,366 dated Aug. 19, 2020; 13 pages.
Raza, Rana Hammad "Three Dimensional Localization and Tracking for Site Safety Using Fusion of Computer Vision and RFID," 2013, Dissertation, Michigan State University.
Non-Final Office Action in U.S. Appl. No. 15/259,474, dated Sep. 1, 2020; 17 pages.
Non-Final Office Action in U.S. Appl. No. 16/206,745 dated Sep. 23, 2020.
Non-Final Office Action in U.S. Appl. No. 15/091,180 dated Oct. 1, 2020.
Non-Final Office Action in U.S. Appl. No. 15/416,379 dated Oct. 2, 2020.
Final Office Action in U.S. Appl. No. 15/091,180, dated Mar. 10, 2021; 24 pages.
Notice of Allowance and Fees Due in U.S. Appl. No. 16/206,745, dated Mar. 12, 2021; 9 pages.
Final Office Action in U.S. Appl. No. 15/259,474, dated Mar. 9, 2021; 23 pages.
International Preliminary Report on Patentability in PCT/US2019/051874 dated Apr. 1, 2021; 8 pages.
Non-Final Office Action in U.S. Appl. No. 16/575,837, dated Apr. 21, 2021; 18 pages.

(56) References Cited

OTHER PUBLICATIONS

Notice of Allowance and Fees Due in U.S. Appl. No. 16/740,679, dated Apr. 20, 2021; 15 pages.
Final Office Action in U.S. Appl. No. 15/861,414 dated Feb. 8, 2021.
Final Office Action in U.S. Appl. No. 15/861,414 dated Nov. 17, 2020.
Non-Final Office Action in U.S. Appl. No. 16/740,679, dated Jan. 6, 2021; 15 pages.
Final Office Action in U.S. Appl. No. 15/416,379, dated May 13, 2021; 18 pages.
International Preliminary Report on Patentability in PCT/US2020/013280 dated Jul. 22, 2021.

* cited by examiner

SYSTEM AND METHOD OF CALIBRATING A DIRECTIONAL LIGHT SOURCE RELATIVE TO A CAMERA'S FIELD OF VIEW

CROSS-REFERENCE TO RELATED APPLICATION

This application claims priority to and the benefit of U.S. Provisional Application No. 62/684,054, titled "System and Method of Calibrating a Directional Light Source Relative to a Camera's Field of View", filed on Jun. 12, 2018, the entirety of which provisional application is incorporated by reference herein for all purposes.

FIELD OF THE INVENTION

The invention relates generally to calibration systems and methods for localizing and orienting an active directional light source relative to a camera.

BACKGROUND

Active directional light sources can provide visual indications and deliver optical energy to variable targets within their line of sight. Cameras can generally provide feedback on the location at which a directional light source is currently oriented. That location is generally referred to herein as the directional light source's terminal point. One method of calibrating the directional light source relative to the camera's field of view has the camera provide active feedback during the targeting process while the laser moves iteratively in the direction of the target. Another method calibrates the directional light source prior to targeting, which allows the light source to accurately direct the terminal point at the target in a single attempt.

The active feedback method can perform poorly in high-speed applications. This poor performance is attributable to the iterative nature of the active feedback process, wherein the terminal point of the directional light source is found repeatedly and the directional light source is then rotated in the direction of its target, with the rate of iterations being limited by the framerate of the camera and by the throughput of the visual processing algorithm used to determine the terminal point's location within an image. This method also has the disadvantage of requiring the directional light source to remain active for some period each time a new target is being acquired, even while the directional light source is not oriented towards the target. This may be unacceptable in some applications.

A directional light source that has undergone a calibration process prior to targeting is capable of being directed to a new target in a single movement, within the constraints of the calibration process it has undergone and can do so even while the directional light source is inactive. However, this method imposes a new set of constraints. For instance, current calibration methods require a known object to be within the line of sight of both the directional light source and the camera to provide a frame of reference. Often, a planar grid of known proportions with a checkerboard pattern is used. This planar grid allows a camera to determine its exact location in a three-dimensional coordinate system along with its relative orientation. The directional light source's terminal point is then guided to various points along the planar grid, either manually or using the aforementioned active feedback, and the angles for each point are recorded. From the angle data, geometrical techniques can then determine the relative location and orientation of the directional light source with respect to the camera.

Systems implementing the calibration method generally take one of two approaches. Either the planar calibration grid remains with the system as a fixture, or the planar grid is put in place only during the calibration process and is removed for normal operation of the system. Systems that retain the planar calibration grid as a fixture suffer from loss of visual range and targetable area. The accuracy of a calibration algorithm depends upon the data coming from a wide range of angles across both the camera's and the directional light source's field of view. Because of this dependence, the planar calibration grid requires a significant amount of area and blocks a large area from being both visible and targetable. Such a large planar calibration grid, which typically requires a unique textured pattern, for example, a checkerboard, is often aesthetically unappealing and can be visually confusing in some applications.

Systems that use a removable planar calibration grid often requires human intervention in order to recalibrate. Such human intervention can cause a significant decrease in the reliability of the system, as even small changes in the orientation of the camera or the mount of the directional light source can require a system recalibration. Human intervention also means that these systems cannot be deployed in unstaffed locations.

SUMMARY

All examples and features mentioned below can be combined in any technically possible way.

In one aspect, the invention is related to a method of calibrating a movable directional light source relative to an optical device. The method comprises virtually projecting a virtual grid comprised of predefined points onto an area having at least one object disposed therein at an unknown location. The directional light source is aimed at each predefined point, in succession, of the virtual grid. The optical device captures, for each predefined point of the virtual grid at which the light source is aimed, a first image of the area while the directional light source is active and a second image of the area while the directional light source is turned off. For each predefined point of the virtual grid at which the directional light source is aimed, the first and second images captured for that predefined point are compared. A light dot is searched for in the first image captured at each predefined point based on the comparison of the first and second images captured for that predefined point. A location and orientation of the directional light source are calibrated relative to the optical device based on angle data of the directional light source associated with each image in which the light dot is found so that the directional light source can be aimed at a new target within a field of vie of the optical device in a single movement while the directional light source is turned off.

In one embodiment, the virtual grid comprises a set of pan and tilt angles at which to position the directional light source to define the predefined points at which the directional light source is aimed.

The method can further comprise acquiring depth data in each image captured by the optical device, wherein the step of calibrating the location and orientation of the directional light source relative to the optical device is further based on the depth data acquired from each image in which the light dot is found.

The method can further comprise determining, when the light dot is found in a given image captured by the optical device, whether the depth data for that light dot is valid. The step of determining whether the depth data for the light dot found in the given image is valid can further comprise determining maximum and minimum depth values for pixels in a window around the light dot in the given a and determining that the depth data for the light dot found in the given image is valid if a difference between the maximum and minimum depth values is less that a predefined threshold value.

The method can further comprise storing in memory, in response to determining that the depth data for the light dot found in the given image is valid, a data point comprised of a pixel location of the light dot in the given image, the depth data for the light dot found in the given image, pan and tilt angles of the directional light source at which the directional light source produced the light dot, and row and column data of the predefined point of the virtual grid at which the directional light source aimed when the directional light source produced the light dot; the data point is used to calibrate the location and orientation of the directional light source relative to the optical device. In addition, the method can further comprise determining that the light dot found in the given image spans a plurality of pixel locations in the given image; and averaging the spanned plurality of pixel locations to calculate the pixel location of the light dot in the given image.

In one embodiment, the method comprises applying one or more filters to the first and second images captured for each predefined point of the virtual grid at which the directional light source is aimed before comparing said first and second images. One of the filters can be a grayscale filter adapted to detect black pixels in said first and second images. One of the filters can be a linear filter weighted towards a color of light that is produced by the directional light source. One of the filters can be a linear filter weighted to an inverse of a color of light that is produced by the directional light source.

In another aspect, the invention is related to a system comprising a movable directional light source aimed, in succession, at each predefined point of a virtual grid that is projected onto an area having therein at least one object disposed at an unknown location. The system further comprises an optical device having a field of view that covers at least a portion of the area. The optical device is configured to capture, for each predefined point of the virtual grid at which the light source is aimed, a first image of the area within the field of view of the optical device while the light source is active and a second image of the area within the field of view of the optical device while the light source is turned off. A processing unit is in communication with the directional light source and the optical device. The processing unit is configured to compare the first and second images captured by the optical device for each predefined point of the virtual grid at which the light source was aimed and to search for a light dot in the first image captured for each predefined point based on the comparison of the first and second images captured for that predefined point. The processing unit is further configured to calibrate a location and orientation of the directional light source relative to the optical device based on angle data of the directional light source associated with each image in which the processing unit finds the light dot so that the directional light source can be aimed at a new target within the field of view of the optical device in a single movement while the directional light source is turned off.

In one embodiment, the virtual grid comprises a set of pan and tilt angles at which to position the directional light source to define the predefined points at which depth data are gathered.

The optical device can be further configured to acquire depth data for each captured image and wherein the calibrating of the location and orientation of the directional light source relative to the optical device is further based on the depth data acquired from each image in which the processing unit finds the light dot.

The processing unit may be further configured to determine, when the light dot is found in a given image captured by the optical device, whether the depth data for the light dot is valid. In one embodiment, the processing unit may be further configured to determine maximum and minimum depth values for pixels in a window around the light dot in the given image, and determine that the depth data for the light dot found in the given image is valid if a difference between the maximum and minimum depth values is less that a predefined threshold value. In addition, the processing unit may be further configured to store in memory, in response to determining that the depth data for the light dot found in the given image is valid, a data point comprised of a pixel location of the light dot in the given image, the depth data for the light dot found in the given image, pan and tilt angles of the directional light source when the directional light source produced the light dot, and row and column data of the predefined point of the virtual grid at which the directional light source aimed when the directional light source produced the light dot. The data point is used by the processing unit to calibrate the location and orientation of the directional light source relative to the optical device.

The processing unit may be further configured to determine that the light dot found in the given image spans a plurality of pixel locations in the given image; and to average the spanned plurality of pixel locations to calculate the pixel location of the light dot n the given image.

The processing unit may be further configured to apply one or more filters to the first and second images captured for each predefined point of the virtual grid when comparing said first and second images. One of the filters may a grayscale filter adapted to detect black pixels in said first and second images, a linear filter weighted towards a color of light that is produced by the directional light source, or a linear filter weighted to an inverse of a color of light that is produced by the directional light source.

The optical device may comprise a camera having a depth sensor.

In yet another aspect, the invention relates to a method for calibrating location and orientation of a directional light source relative to a field of view of an optical device. The method comprises directing light from the directional light source to a plurality of points on a virtual grid configured to overlay the field of view of the optical device; capturing, by the optical device, for each point of the plurality of points on the virtual grid to which the directional light source directs the light, an image; locating a light dot in a plurality of captured images; and calibrating the location and orientation of the directional light source relative to the field of view of the optical device based on coordinates of each located light dot and on relative coordinates of the optical device.

The method may further comprise acquiring depth data in each image captured by the optical device, and wherein calibrating the location and orientation of the directional light source relative to the field of view of the optical device is further based on the depth data acquired from each captured image in which the light dot is located.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention. Various aspects of at least one embodiment are discussed below with reference to the accompanying figures, which are not intended to be drawn to scale. For purposes of clarity, not every component may be labeled in every figure. In the figures.

DETAILED DESCRIPTION

Described herein are computer-vision systems with light-guidance capability and methods of calibrating a directional light source relative to the field of view of the camera. The systems can determine the relative position and orientation of the directional light source to camera with enough precision to enable the directional light source to be aimed at targets within the field of view of the camera without using any known object or specialized visual markers. The calibration methods described herein provides for targeting with speed and accuracy and allow the light source to be activated only when aimed directly at the target during normal light-guidance operation. Accuracy, in general, is measured in degrees offset from a target feature. Targeting is more accurate than active feedback because it uses a large dataset, which allows slight random errors to cancel out and ignores areas where data are difficult to detect during calibration, but can extrapolate data from elsewhere to determine accurate targeting information in those areas.

In one embodiment, a computer-vision system achieves this targeting capability using a camera with an infrared channel by which the camera can determine the approximate distance to locations within its field of view. Using this distance-measurement capability, the computer-vision system finds the location of the terminal point of the directional light source in a three-dimensional coordinate system. The additional depth data relaxes the requirements for data collection, allowing data collection from a set of data points across the field of view without being constrained to a single plane or other specialized surface.

To complete the calibration process, an argument minimization algorithm (e.g., Levenberg-Marquardt) operates on a model of the directional light source to find a set of location and orientation parameters that best fits the data, collected by the camera, of the terminal point locations corresponding to when the directional light source is rotated to various angles.

Figure 1:
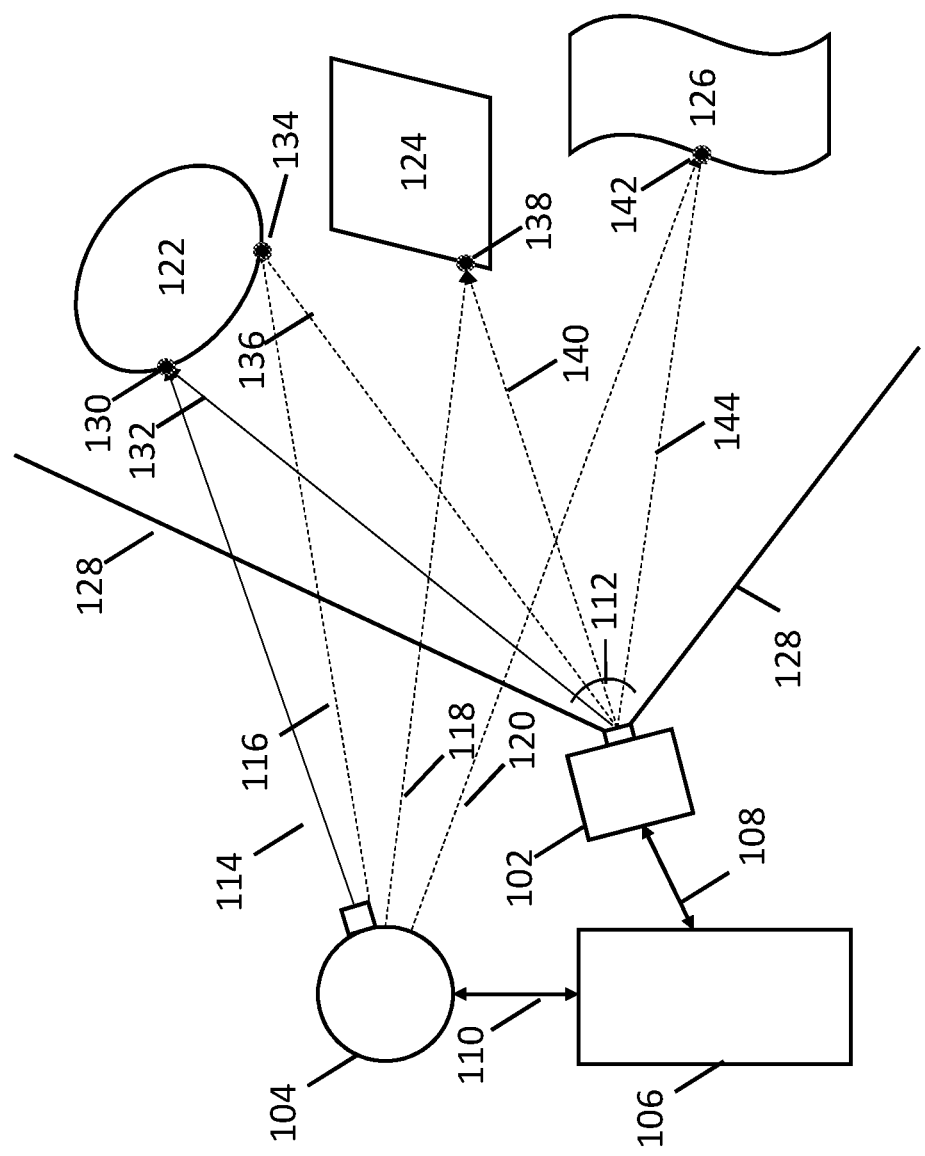
FIG. 1 is a diagram of an embodiment of a computer-vision system with light-guidance capability operating within an environment containing one or more unknown objects.

FIG. 1 shows an embodiment of a computer-vision system 100 with light-guidance capability including a camera 102, a directional light source 104, and a computer system 106 (or processing unit). The camera 102 is connected to the computer system 106 by a communication cable 108; the directional light source 104 is connected to the computer system 106 by a communication cable 110. In one embodiment, the communication cables 108, 110 are bidirectional serial communication cables.

The camera 102 is an RGB (red-green-blue) camera equipped with a sensor through which the camera acquires color images of persons, objects (or things) within its field of view 112. The camera 102 may also include a depth sensor for measuring distance to those objects or persons within the field of view 112. Such a depth sensor captures depth data for each pixel in a captured image. The camera 102 may be, for example, an Intel® Realsense™ camera produced by Intel Corporation of Santa Clara, Calif. In another embodiment, the depth sensor is a separate device from the camera. Whether or not the depth sensor is included in the camera, a mapping may be performed, by the camera 102 or the computer system 106, to calibrate the fields of view of the depth sensor and the camera relative to each other so that a measured distance to an object or person is with respect to the camera's field of view 112.

In one embodiment, the directional light source 104 is comprised of a 5-mW laser seated in a two-axes gimbal with a rigid mount. The laser gimbal is stationed in the vicinity of the camera 102 such that the terminal point of the laser may be directed into the camera's field of view. Other embodiments of directional light sources include projectors and flashlights.

The computer system 106 includes a processor, data store (i.e., memory), I/O interfaces, and program code (not shown) that, when executed, performs the methods of calibration to determine relative position and orientation of the camera 102 and light source 104, as described herein.

During a calibration process, the directional light source 104 casts a set of beams as the gimbal iteratively turns, starting with an initial beam 114, followed by beam 116, then beam 118, and then beam 120. An angle of each turn is chosen with an objective of getting enough datapoints and a low enough final average error between the test data and the calculated output, as compared to a threshold setting that is determined based on the application (i.e., use) for which the system is being calibrated. In general, smaller angles between datapoints provide more opportunities to gather data for the same range but increase the time taken by the calibration process to operate. In one embodiment, an angle of 5 degrees is used for each turn of the gimbal. In addition, the calibration process does not require any object in the foreground to operate. Each beam falls upon a wall in the background or upon any object of unknown (i.e., unconstrained) geometry which may be present in front of the wall at the time of targeting. In the present example, the termination points 130, 134 of beams 114, 116, respectively, are on a surface of object 122, the termination point 138 of beam 118 is on object 124, and the termination point 142 of beam 120 is on object 126. Also, each termination point of the beams 114, 116, 118, and 120 falls within the camera's field of view 112, the boundaries of which are represented by lines 128. The camera 102 is used to detect each termination point and determines the depth (i.e., distance) to that termination point. For example, the camera is used to detect the termination point 130 of beam 114 along path 132, the termination point 134 of beam 116 along path 136, the termination point 138 of beam 118 along path 140, and the termination point 142 of beam 120 along path 144.

Figure 2:
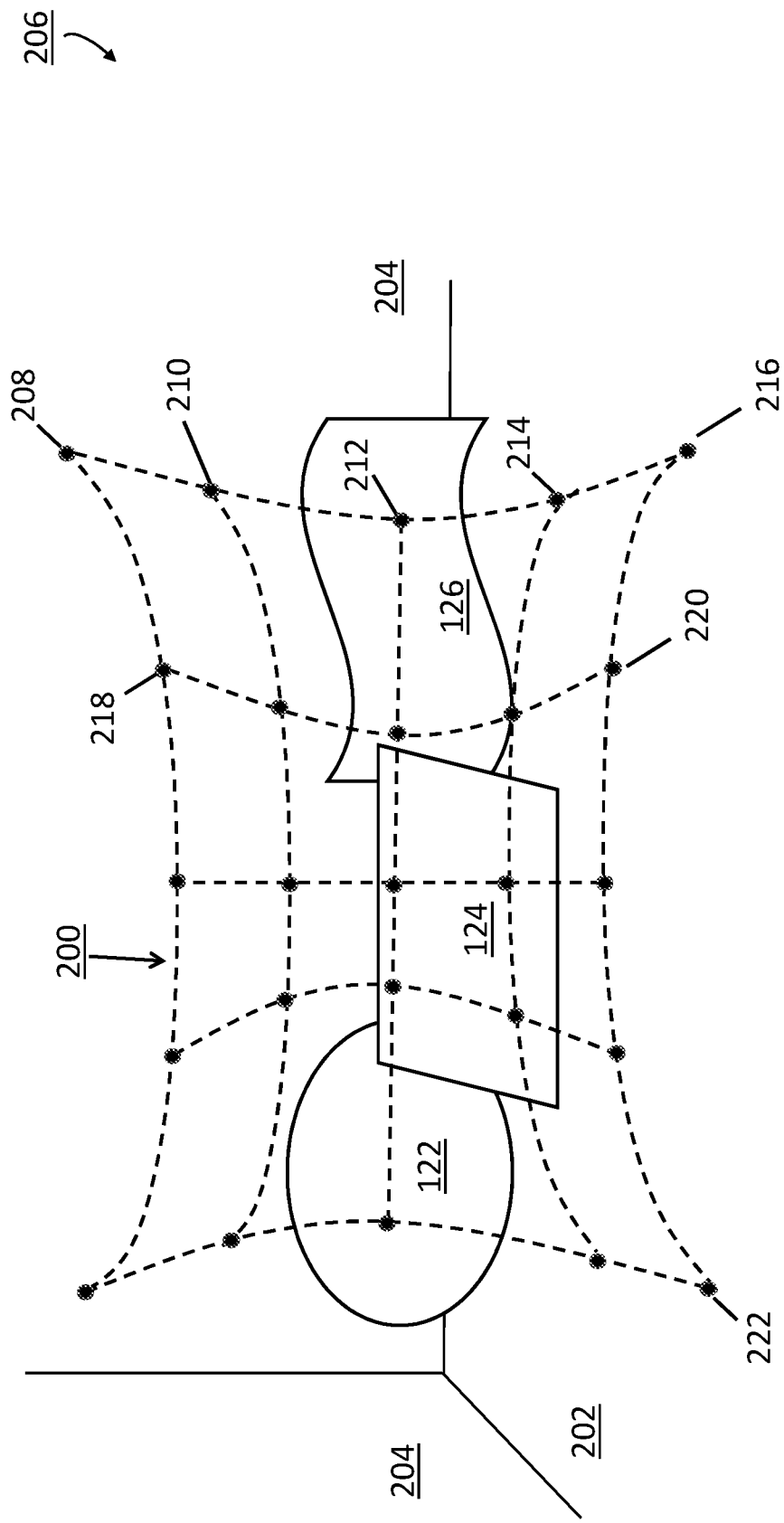
FIG. 2 is a diagram of an example of a virtual grid projected onto the objects in the environment shown in FIG. 1.

FIG. 2 shows an example embodiment of a virtual grid 200 that is virtually projected onto the potential background objects 122, 124, 126 and onto the floor 202 and walls 204 of the enclosing room 206 during the calibration process. The virtual grid 200 is not visible; rather the virtual grid represents the set of all points to which the processing unit 106 drives the directional light source during the calibration process. In one embodiment, the virtual grid 200 comprises a set of pan and tilt angles at which to position the laser gimbal to establish the test points at which data are gathered. This set of pan and tilt angles can encompass the entire angular range of the laser gimbal 104. In one embodiment, an approximation of the relative position and orientation of the laser gimbal 104 suffices to generate a set of test points that fall within the field of view 112 of the camera 102. Information, such as the camera and laser are physically close to each other and point generally in the same direction, serves to formulate an approximation that avoids test points that are outside of the field of view of the camera. The approximation can thus help speed up the calibration process by avoiding test points the camera cannot see. Accordingly, in principle, the approximation of the relative position and orientation of the laser gimbal helps determine test points that are used to determine more precise values of the relative position and orientation.

The virtual grid 200 comprises a set of column lines (running vertically) and row lines (running horizontally). Because the pan and tilt motors that aim the laser of the laser gimbal operate in a spherical coordinate system, the virtual grid 200 appears warped and column and row lines appear as parabolas when projected onto a plane. Points on the virtual grid 200 occur where a column intersects a row. Each point on the virtual grid 200 corresponds to one of the termination points of the beams cast by the directional light source 104. Depth data are collected at each point. The example virtual grid 200 shown in FIG. 2 has five rows, five columns, and twenty-five test points (also referred to as data collection points). Other embodiments can have fewer or more rows and/or columns, and thus fewer or more data collection points.

For purposes of illustrating an example calibration process, a first test point 208 of the virtual grid 200 corresponds to the upper right corner (where the rightmost column intersects the topmost row), and a second point 210 of the virtual grid 200 lies immediately below the first point 210 (where the rightmost column intersects the second row). Successive points 212, 214, and 216 fall on the rightmost column at the intersections of the third, fourth, and fifth rows, respectively. The points 208, 210, 212, 214, and 216 are considered the "first pass" made by the iteratively moved directional light source. In this embodiment, the calibration process collects data in a set of columns, traveling down one column from its top test point to its bottom test point, before moving to an adjacent column (if any) and repeating the data collection for that column starting with its top test point. One column of data collection attempts from top to bottom is considered "a pass".

The next pass begins at the top of the second column from the right, at the point 218, and successively progresses down the column to the bottommost point 220. The pattern repeats with the next column to the left, with points on the bottom row being followed by the point on the top row of the next column to the left, until the final point 222 at the intersection of the leftmost column with the bottom row is reached.

Figure 3A:
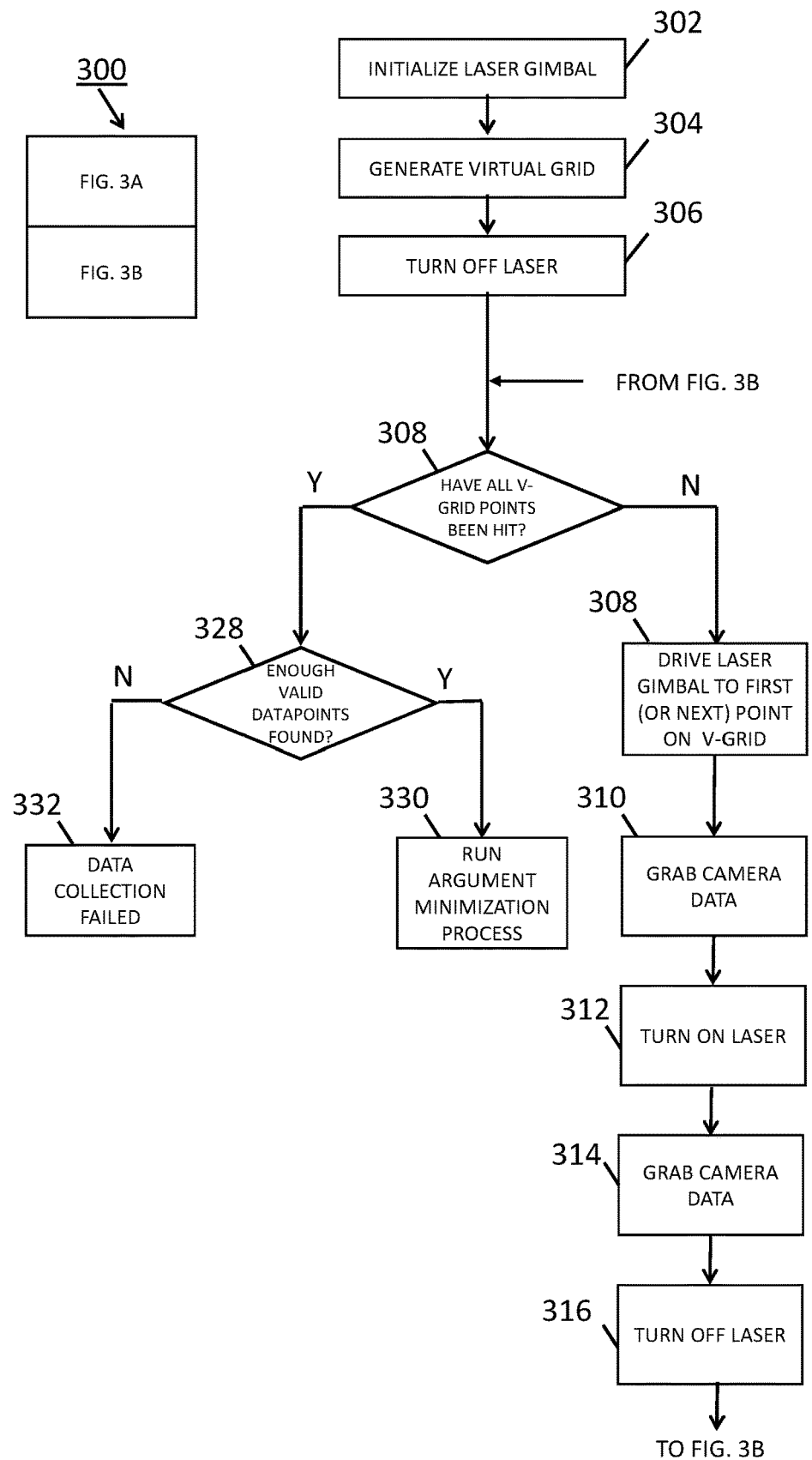
FIG. 3A and FIG. 3B together are a flowchart of an example of a calibration process used by the system of FIG. 1.
Figure 3B:
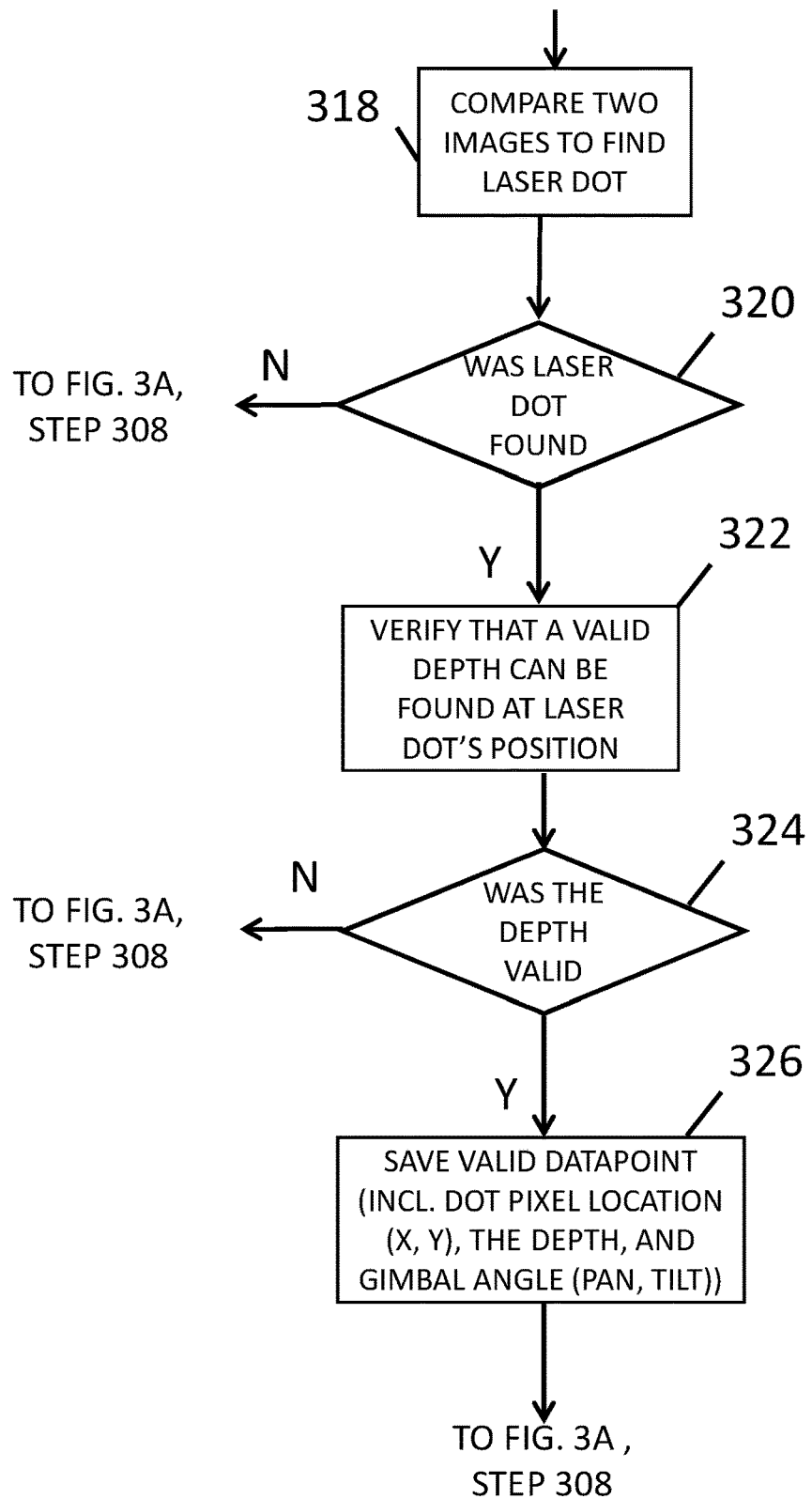

FIG. 3A and FIG. 3B together show an embodiment of a calibration process 300, which collects data used to calibrate the laser gimbal with respect to the camera. The calibration process can be considered to have three major processes: a data collection process, which uses camera data and laser control as input data and produces a set of data points, including pixel location (u, v), depth (s), and laser angles ($x_{tilt}$, $y_{pan}$) as output data; a data preprocessing process, which uses pixel location (u, v), depth (s), and intrinsic parameters of the camera as input data and produces the absolute positions of the laser dots (X, Y, Z) as output data; and an argument minimization stage, which uses the absolute position of the laser dots (X, Y, Z) and corresponding laser angles ($x_{tilt}$, $y_{pan}$) as input data and produces the rotational and translational parameters (R, t) as output data.

In the description of the calibration process, reference is made to elements of FIG. 1 and FIG. 2. As shown in FIG. 3A, the laser gimbal 104 is initialized at step 302. Initialization entails powering up and homing the pan and tilt axis motors of the laser gimbal to a repeatable coordinate system. At step 304, a virtual grid, such as the virtual grid 200 described in connection with FIG. 2, is generated.

Generation of the virtual grid (i.e., the pan and tilt angles) can be predetermined. In one embodiment, the virtual grid is generated using a set of initial parameters including pan range, tilt range, center position, number of passes, and the number of test points per pass. Points per pass can be increased to maximize accuracy, at the cost of adding more time to the data collection step. Some of those inputs can be determined from an approximation of the relative position and orientation of the gimbal, as previously described, to keep all collected data points within the field of view. For situations where an estimate is not available, large ranges are recommended to maximize the likelihood that points fall within the field of view. Other factors for generating the virtual grid include, but are not limited to, the amount of time within which to perform calibration and the desired accuracy. For situations where an approximation of the relative orientation and position of the directional light source to the camera are known, the center position, pan range, and tilt range can be configured.

The laser (i.e., the directional light source) is turned off (step 306) as data collection begins in order to allow for images of the background to be taken. The laser is then driven (step 308) to the first test point on the virtual grid 200. The first test point is typically a point at one of the corners of the virtual grid 200. While the laser remains off, an image of the area within the camera's field of view is captured and saved (step 310). The laser is then turned back on (step 312) and another image of the area within the camera's field of view is captured (step 314). This second captured image potentially contains a laser dot (i.e., an illuminated termination point of the directional light source). The laser is then returned to the off state (step 316) to prepare for the next test point.

As shown in FIG. 3B, the two images are compared (step 318) by the processing unit to determine the presence and location of a laser dot. If, at step 320, a laser dot is found, a depth validation process is run (step 322) to ensure that the depth value of the laser dot's location captured by the camera was determined accurately. If, at step 324, the depth validation process determines the depth value was valid, the valid data point is saved (step 326), together with the pixel location (x, y) of the laser dot, the depth value, and the pan and tilt angles of the laser gimbal. The calibration process resumes at step 308 (FIG. 3A) to either move the laser gimbal to the next point on the virtual grid (if data collection at all virtual grid test points has not yet been performed) and then repeat the pattern of data collection at that point, or to finish the calibration process (after data collection at all points has been performed). Further, if a laser dot is not found at step 320, or if a laser dot is found but the depth value captured by the camera could not be validated at step 322, the calibration process returns to step 308 of FIG. 3A.

When the calibration process resumes at step 308 (FIG. 3A), and if all virtual grid test points have been examined, the calibration process 300 determines (step 328) whether enough valid datapoints have been collected. In one embodiment, six valid datapoints constitute enough datapoint collection, which equals the number of arguments to be minimized to determine the relative position and orientation. More than six valid datapoints is preferred. Upon completion of successful data collection, the data set is composed of a set of pan and tilt values for the laser gimbal, along with the corresponding row, column, and depth values describing where the laser dot was found within the camera's field of view. An argument minimization process runs (step 330) if enough valid datapoints have been found; otherwise the calibration process 300 is deemed to have failed (step 332). In the event the calibration process 300 is deemed to have failed, it may be restarted. In cases where failure occurs repeatedly, adjustments to the virtual grid can be considered, including increasing the pan or tilt range, and increasing the number of passes.

Figure 4A:
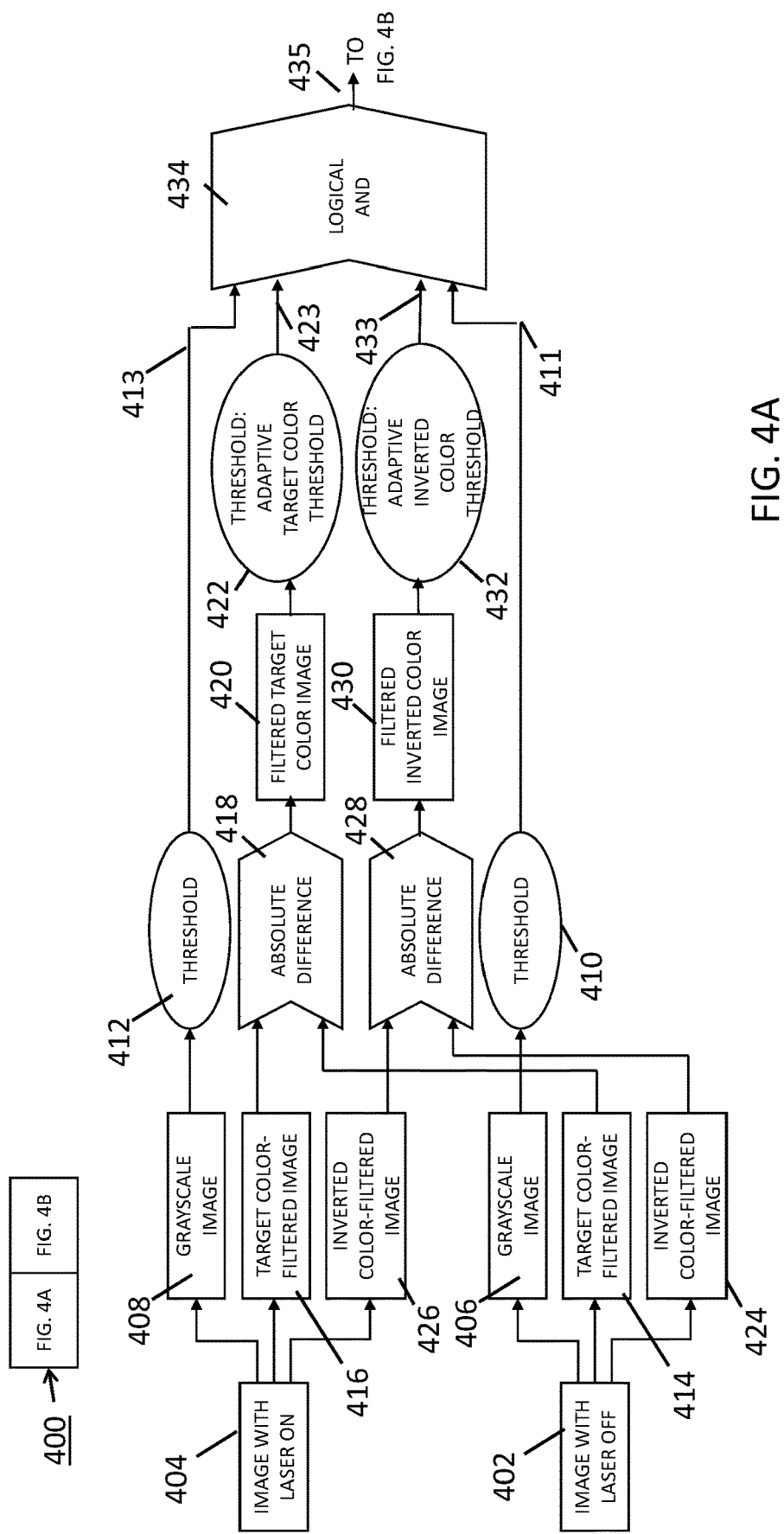
FIG. 4A and FIG. 4B together are a process flow diagram showing an embodiment of a method used to find laser dots used by the system of FIG. 1.
Figure 4B:
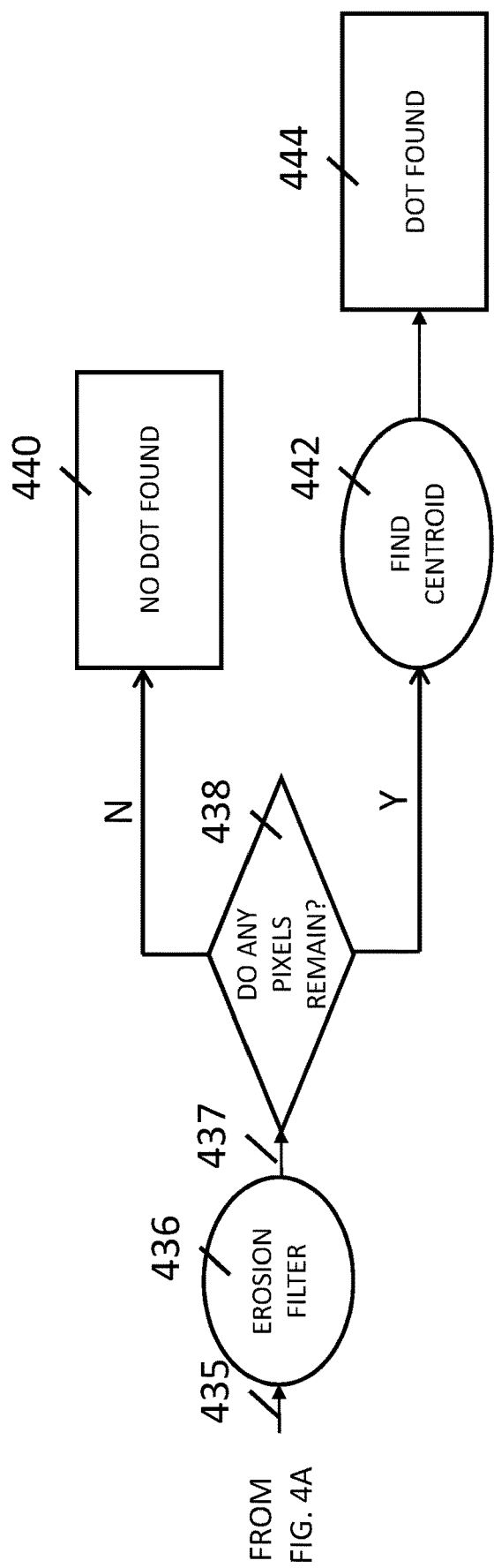

FIG. 4A and FIG. 4B together show an embodiment of a process 400 for searching for a laser dot in an image. This laser dot search process 400 can be used in step 318 of the previously described calibration process 300. The camera captures (step 310 of FIG. 3A) a first image 402 of a scene within the camera's field of view while the laser is turned off and captures (step 314 of FIG. 3A) a second image 404 of the scene while the laser is turned on. A set of filters are applied to both images 402, 404.

One filter is a simple grayscale filter, in which the red, green, and blue values are averaged, to produce a grayscale version 406, 408 of each input image 402, 404, respectively. These greyscale images 406, 408 simplify the detection of pitch-black pixels, which are a common form of noise for a camera setup. A threshold value 410, 412 of 0 is then used to generate a bitmask 411, 413 for each greyscale image 406, 408, respectively, that represents the locations of all non-black pixels in those greyscale images. As used herein, a bitmask has one bit for each pixel for a given image. A value of 0 represents a black pixel, and a bitmask with a threshold of 0 provides an output which represents all non-black pixels.

A second filter is a linear weighted filter used to find the characteristic color of the laser in each input image 402, 404. The weightings for the RGB values are biased towards the color of the laser, making the color of the laser stand out more in the image, and filters out white, thereby producing two target-colored filtered images 414, 416 for the input images 402, 404, respectively. The absolute difference 418 of the two target-colored filtered images 414, 416 is determined, thereby producing a single target-color filtered image 420. This target-color filtered image 420 tends to highlight the areas of the image illuminated by the laser, but also tends to include reflections of the laser dot, which may make it difficult to determine the laser location directly from this image 420. This target-color filtered image 420 can also include considerable noise caused by the existence of pixels that appear black in one of the input images 402, 404 and not in the other. An adaptive target-color threshold 422 is then used to generate a bitmask 423 representing the locations of particularly red pixels in the target-color filtered image 420. The threshold 422 is designed to identify the pixels that have become redder as a result of the laser being turned on, which is represented by high-value pixels in a red-filtered image of the difference 418 of the two images 414, 416.

A third filter applied to the input images 402, 404 is a linear weighted filter that produces two inverted color filtered images 424, 426, respectively, that are biased towards white, but invariant to the color of the laser. This inverted color filtering is accomplished by weighting the linear filter towards the inverse of the laser's color. The absolute difference 428 of the two inverted color filtered images 424, 426 is determined, which produces a single filtered inverted-color image 430. This filtered inverted-color image 430 is useful because the image 430 retains a white dot at the center of the primary laser dot, while ignoring reflections which tend not to have a central white dot. An adaptive inverted color threshold 432 is then used to generate a bitmask 433 representing the locations of the white and inverted color pixels in the filtered inverted-color image 430.

A logical AND function 434 is then used to find the overlap, also known as the intersection, of the four bitmasks 411, 413, 423, and 433. The logical AND function 434 produces a bitmask 435 with a 1 value for each pixel where all four bitmasks 411, 413, 423, and 433 have a 1 value (i.e., they overlap), and a 0 value for every other pixel that does not meet this logical AND criteria. Referring to FIG. 4B, the resulting overlap bitmask 435 passes to an erosion filter 436. This erosion filter 436 eliminates any small areas of pixels (e.g., one to six) that may have made it through the previous filters, which likely represent noise, and produces a final bitmask 437. If the original image 404, taken while the laser was on, did not contain a laser dot, the final bitmask 437 will be black. If the final bitmask 437 is black (block 438), a laser dot is deemed to not have been found (block 440). If any pixels remain that are not black (block 438), then the average location (i.e., centroid) of these pixels are found (block 442), and this average location is deemed the location of the laser dot (block 444).

Figure 5:
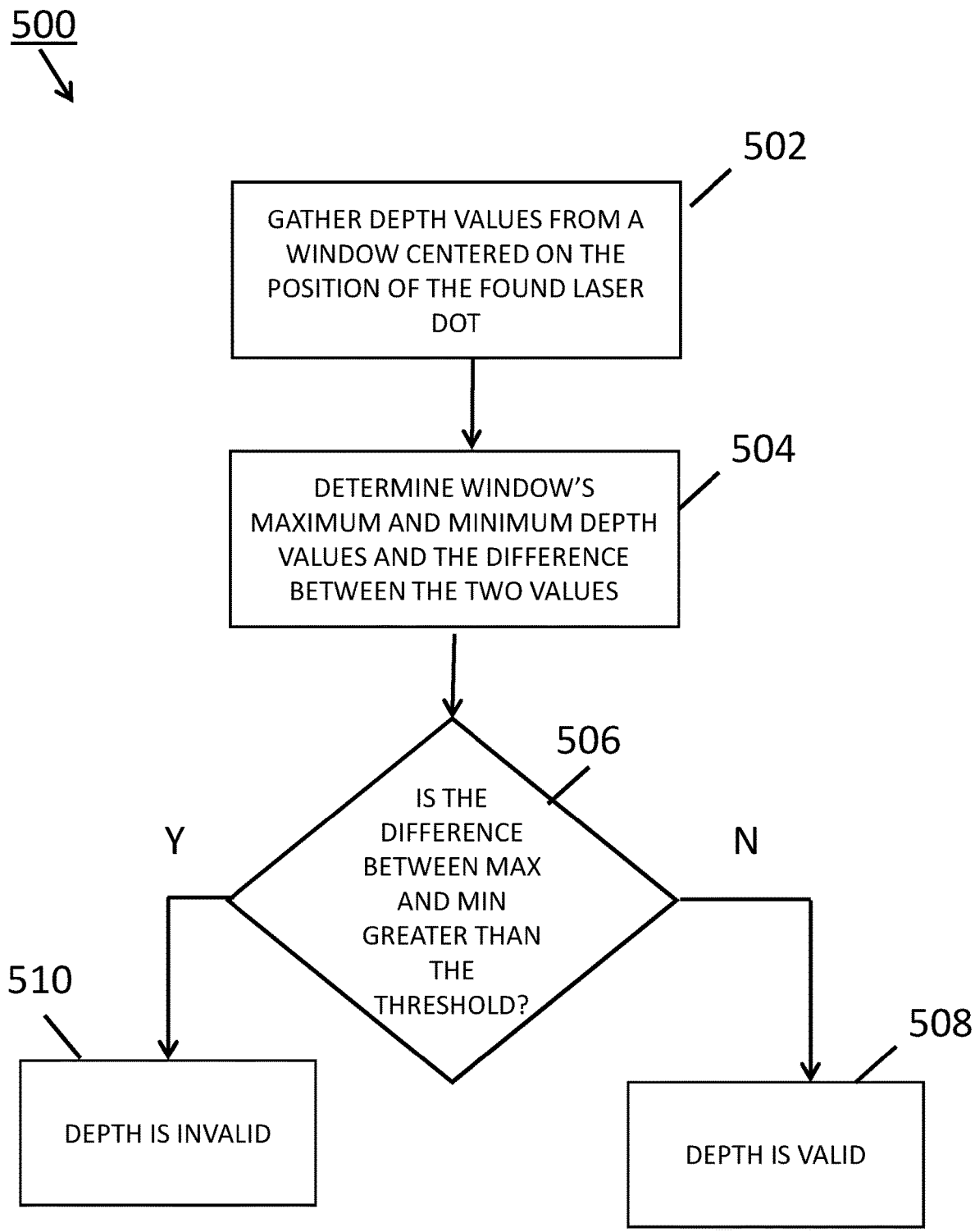
FIG. 5 is a flowchart of an example of a process used to determine if the depth measurement for a given data point can be considered valid.

FIG. 5 shows an embodiment of a depth validation process 500 that may be used at step 322 of the calibration process 300 described in connection with FIG. 3A and FIG. 3B. At step 502, depth values are acquired from a window centered around the position of the laser dot found in block 444 of FIG. 4B and evaluated. The size of the window can vary depending on the kind of environment of the camera and directional light source. For example, an 8-pixel by 8-pixel window is an effective size for an indoor environment. At step 504, the maximum and minimum values of the measured depths are found and the difference between these values are determined. The difference is compared (step 506) against a threshold to determine if the depth value at the exact location of the laser dot can be considered valid. If the difference is less than the threshold, the depth value is deemed valid (step 508); if the difference is greater than the threshold, the depth value is deemed invalid (step 510). This depth validation process 500 can screen out depth values that are measured on surfaces substantially perpendicular to the camera's field of view, that are near the edges of objects, or that are in areas with high noise levels. These circumstances contribute to high error levels in depth measurements (and thus lead to greater differences between measured minimum and maximum values) and screening out datapoints that exceed the threshold increases the quality of the final calibration.

Figure 6:
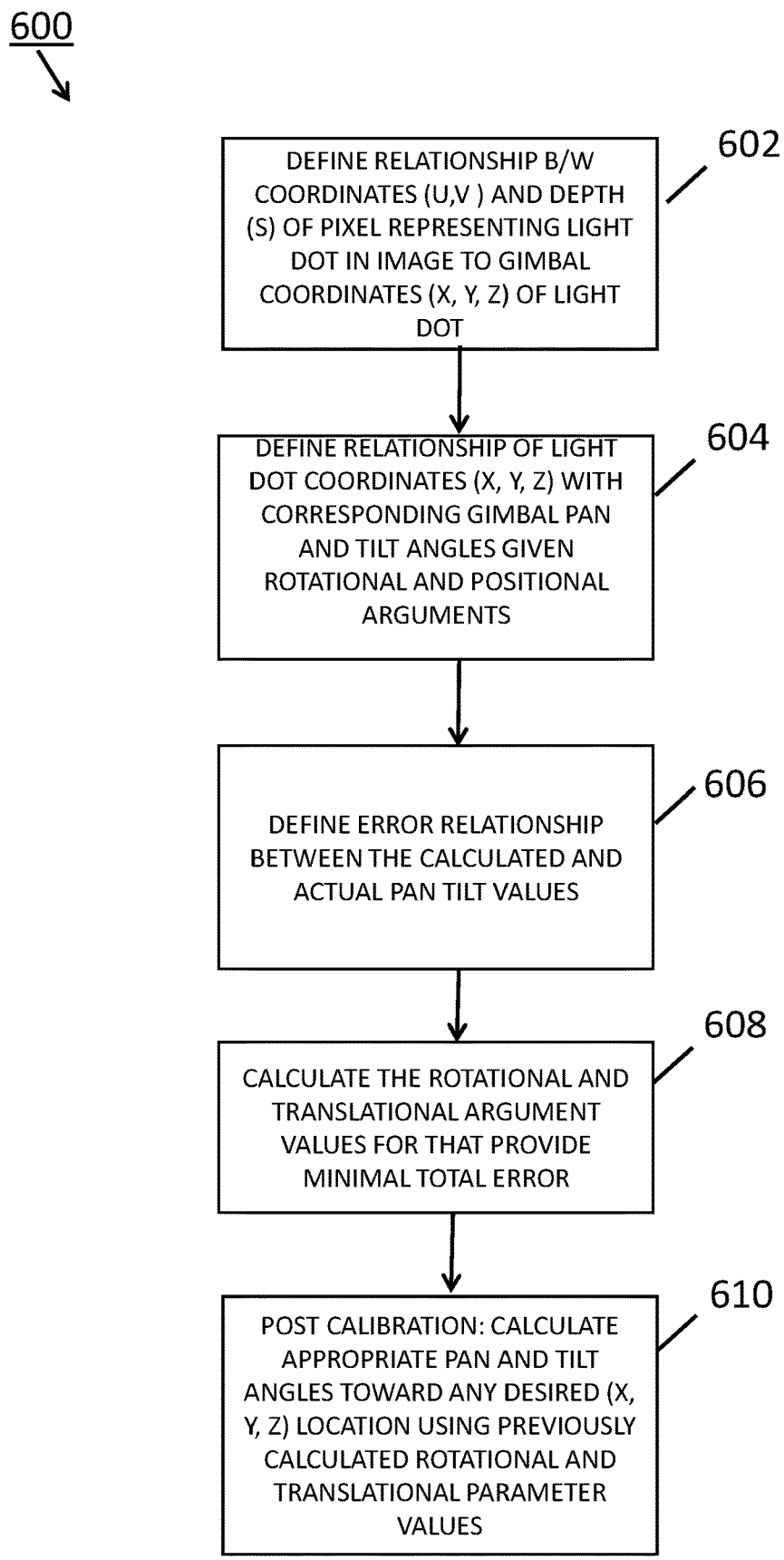
FIG. 6 is a flowchart of an example of an argument minimization process used to find a set of location and orientation parameters that best fits the data collected by the camera of light dots corresponding to where the directional light source pointed when rotated to various angles.

FIG. 6 shows an embodiment of an argument minimization process 600 that may be used at step 330 of the calibration process 300 described in connection with FIG. 3A and FIG. 3B. In general, the argument minimization process 600 finds a set of location and orientation parameters that best fits the data collected, by the camera, of light dots that correspond to where the directional light source pointed when rotated to various angles.

The following equation is used to describe (step 602) the mapping from absolute cartesian coordinates (X, Y, Z) representing the location of a laser dot relative to the laser gimbal to the pixel row and column coordinates (u, v), with the depth value as a scaling factor (s), of that laser dot found in an image.

$$s \begin{bmatrix} u \\ v \\ 1 \end{bmatrix} = A(R \mid t) \begin{bmatrix} X \\ Y \\ Z \\ 1 \end{bmatrix} \quad \text{Eq. 1}$$

In EQ. 1, the A matrix represents the intrinsic parameters, such as optical center and focal length, of the camera, which may be known for a given camera, or which may be pre-calibrated once with the use of a checkerboard pattern as the intrinsic parameters do not change over time or with the placement of the camera. The R matrix and t vector represent the rotational and translational transformation between the laser gimbal's and the camera's coordinate systems, respectively. An objective of the argument minimization process 600 is to solve for the R matrix, which represents the orientation (i.e., rotational) difference, and the t vector, which represents the position (i.e., translational) difference. The R matrix and the t vector are determined from the dataset of pixel row and column coordinates (u, v), depth values (s), and laser gimbal angle coordinates (pan, tilt) using Levenberg-Marquardt optimization.

As the absolute coordinates of the laser dot are unknown, and only the pan and tilt angles of the laser gimbal are known, the following relationships are defined (step 604) between the pan and tilt angles, $y_{pan}$ and $x_{tilt}$ respectively, and the absolute cartesian coordinates of the laser dot, X Y and Z. $Y_{pan}$ and $X_{tilt}$ are angular coordinates representing the current state of the laser gimbal.

$$\tan(y_{pan}) = \frac{X}{Z} \quad \text{Eq. 2}$$

$$\tan(x_{tilt}) = -\frac{Y}{\sqrt{(X*X)+(Z*Z)}} \quad \text{Eq. 3}$$

From the above relationships, the following equations for the X and Y values can be derived.

$$X = \tan(y_{pan}) * Z \quad \text{Eq. 4}$$

$$Y = -\tan(x_{tilt}) * Z * \sqrt{\tan(y_{pan})*\tan(y_{pan})+1} = -\frac{\tan(x_{tilt})}{\cos(y_{pan})} * Z \quad \text{Eq. 5}$$

Using the above equations (Eq. 4 and Eq. 5) for the X and Y positions, a system of equations (Eq. 6) can be constructed using the transformation from the laser gimbal's coordinate system to the camera's coordinate system along with the following equations (Eq. 7 and Eq. 8) corresponding to the respective ratios between the X and Z coordinates and the Y and Z coordinates of the position of the laser dot that are solely dependent on the pan and tilt angles of the laser gimbal.

$$\begin{bmatrix} X \\ Y \\ Z \end{bmatrix} = R^{-1}\left(A^{-1}s \begin{bmatrix} u \\ v \\ 1 \end{bmatrix}\right) + t \quad \text{Eq. 6}$$

$$\tan(y_{pan}) = \frac{X}{Z} \quad \text{Eq. 7}$$

$$\frac{\tan(x_{tilt})}{\cos(y_{pan})} = \frac{Y}{Z} \quad \text{Eq. 8}$$

In addition to the above relationships, a metric for error is defined. (step 606)

The Levenberg-Marquardt algorithm is then used (step 608) along with the pixel row and column coordinates (u, v), depth values (s), and laser gimbal angle coordinates (pan, tilt) collected in the steps described in FIG. 3A and FIG. 3B to find parameter values for the rotational and translational transformations that minimize the error of the above equations for transforming the collected data from the camera's row, column, and depth values to the laser gimbal's pan and tilt angles. These rotational and translational parameter values serve to localize and orient the camera relative to the laser gimbal's coordinate system.

After completing the above calibration process, the appropriate pan and tilt angles to direct the laser gimbal towards any X, Y, and Z absolute coordinates can be calculated (step 610) directly using equations 9 and 10 below. These equations are algebraic manipulations of equations 7 and 8.

$$y_{pan} = \operatorname{atan}\left(\frac{X}{Z}\right) \quad \text{Eq. 9}$$

$$x_{tilt} = \operatorname{atan}\left(\frac{Y}{Z}\cos(y_{pan})\right) \quad \text{Eq. 10}$$

The X, Y and Z values required for the above calculation can be calculated from camera data using equation 6, using the rotational and translational parameter values for R and t respectively, that were determined during the argument minimization process.

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include Python, C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment", "an embodiment", "another embodiment", or the like are not necessarily mutually exclusive and mean that a specific feature, structure or characteristic described in connection with the embodiment is included in at least one embodiment described herein. A reference to a specific embodiment within the specification do not necessarily all refer to the same embodiment. The features illustrated or described in connection with one exemplary embodiment may be combined with the features of other embodiments in any manner consistent with at least one of the principles disclosed herein. Accordingly, it is intended to embrace all such alternatives, modifications, equivalents, and variations that are within the spirit and scope of the principles described herein.

What is claimed is:

1. A method of calibrating a movable directional light source relative to an optical device, the method comprising the steps of:
  virtually projecting a virtual grid comprised of predefined points onto an area having at least one object disposed therein at an unknown location;
  aiming the directional light source at each predefined point, in succession, of the virtual grid, each predefined point of the virtual grid corresponding to one of a plurality of termination points of beams cast by the directional light source, at least one of the termination points of the beams are on a surface of the at least one object;

capturing by the optical device, for each predefined point of the virtual grid at which the light source is aimed, a first image of the area while the directional light source is active and a second image of the area while the directional light source is turned off;

comparing, for each predefined point of the virtual grid at which the directional light source is aimed, the first and second images captured for that predefined point;

searching for a light dot in the first image captured at each predefined point based on the comparison of the first and second images captured for that predefined point; and calibrating a location and orientation of the directional light source relative to the optical device based on angle data of the directional light source associated with each image in which the light dot is found, so that the directional light source can be aimed at a new target within a field of view of the optical device in a single movement while the directional light source is turned off.

2. The method of claim 1, wherein the virtual grid comprises a set of pan and tilt angles at which to position the directional light source to define the predefined points at which the directional light source is aimed.

3. The method of claim 1, further comprising the step of acquiring depth data in each image captured by the optical device, and wherein the step of calibrating the location and orientation of the directional light source relative to the optical device is further based on the depth data acquired from each image in which the light dot is found.

4. The method of claim 1, further comprising the step of determining, when the light dot is found in a given image captured by the optical device, whether the depth data for that light dot is valid.

5. The method of claim 4, wherein the step of determining whether the depth data for the light dot found in the given image is valid further comprises the steps of:

determining maximum and minimum depth values for pixels in a window around the light dot in the given image; and determining that the depth data for the light dot found in the given image is valid if a difference between the maximum and minimum depth values is less that a predefined threshold value.

6. The method of claim 4, further comprising the step of storing in memory, in response to determining that the depth data for the light dot found in the given image is valid, a data point comprised of a pixel location of the light dot in the given image, the depth data for the light dot found in the given image, pan and tilt angles of the directional light source at which the directional light source produced the light dot, and row and column data of the predefined point of the virtual grid at which the directional light source aimed when the directional light source produced the light dot, the data point being used to calibrate the location and orientation of the directional light source relative to the optical device.

7. The method of claim 6, further comprising the steps of:

determining that the light dot found in the given image spans a plurality of pixel locations in the given image; and averaging the spanned plurality of pixel locations to calculate the pixel location of the light dot in the given image.

8. The method of claim 1, wherein the step of applying one or more filters to the first and second images captured for each predefined point of the virtual grid at which the directional light source is aimed before comparing said first and second images.

9. The method of claim 1, wherein one of the one or more filters is a grayscale filter adapted to detect black pixels in said first and second images.

10. The method of claim 1, wherein one of the one or more filters is a linear filter weighted towards a color of light that is produced by the directional light source.

11. The method of claim 1, wherein one of the one or more filters is a linear filter weighted to an inverse of a color of light that is produced by the directional light source.

12. A system comprising:

a movable directional light source aimed, in succession, at each predefined point of a virtual grid that is projected onto an area having therein at least one object disposed at an unknown location, each predefined point of the virtual grid corresponding to one of a plurality of termination points of beams cast by the directional light source, at least one of the termination points of the beams are on a surface of the at least one object;

an optical device having a field of view that covers at least a portion of the area, the optical device being configured to capture, for each predefined point of the virtual grid at which the light source is aimed, a first image of the area within the field of view of the optical device while the light source is active and a second image of the area within the field of view of the optical device while the light source is turned off; and a processing unit in communication with the directional light source and the optical device, the processing unit being configured to compare the first and second images captured by the optical device for each predefined point of the virtual grid at which the light source was aimed and to search for a light dot in the first image captured for each predefined point based on the comparison of the first and second images captured for that predefined point, the processing unit being further configured to calibrate a location and orientation of the directional light source relative to the optical device based on angle data of the directional light source associated with each image in which the processing unit finds the light dot so that the directional light source can be aimed at a new target within the field of view of the optical device in a single movement while the directional light source is turned off.

13. The system of claim 12, wherein the virtual grid comprises a set of pan and tilt angles at which to position the directional light source to define the predefined points at which depth data are gathered.

14. The system of claim 12, wherein the optical device is further configured to acquire depth data for each captured image and wherein the calibrating of the location and orientation of the directional light source relative to the optical device is further based on the depth data acquired from each image in which the processing unit finds the light dot.

15. The system of claim 12, wherein the processing unit is further configured to determine, when the light dot is found in a given image captured by the optical device, whether the depth data for the light dot is valid.

16. The system of claim 15, wherein the processing unit is further configured to:

determine maximum and minimum depth values for pixels in a window around the light dot in the given image; and determine that the depth data for the light dot found in the given image is valid if a difference between the maximum and minimum depth values is less that a predefined threshold value.

17. The system of claim 16, wherein the processing unit is further configured to store in memory, in response to determining that the depth data for the light dot found in the given image is valid, a data point comprised of a pixel location of the light dot in the given image, the depth data for the light dot found in the given image, pan and tilt angles of the directional light source when the directional light source produced the light dot, and row and column data of the predefined point of the virtual grid at which the directional light source aimed when the directional light source produced the light dot, the data point being used by the processing unit to calibrate the location and orientation of the directional light source relative to the optical device.

18. The system of claim 17, wherein the processing unit is further configured to:
  determine that the light dot found in the given image spans a plurality of pixel locations in the given image; and
  average the spanned plurality of pixel locations to calculate the pixel location of the light dot in the given image.

19. The system of claim 12, wherein the processing unit is further configured to apply one or more filters to the first and second images captured for each predefined point of the virtual grid when comparing said first and second images.

20. The system of claim 19, wherein one of the one or more filters is a grayscale filter adapted to detect black pixels in said first and second images.

21. The system of claim 19, wherein one of the one or more filters is a linear filter weighted towards a color of light that is produced by the directional light source.

22. The system of claim 19, wherein one of the one or more filters is a linear filter weighted to an inverse of a color of light that is produced by the directional light source.

23. The system of claim 12, wherein the optical device comprises a camera having a depth sensor.

* * * * *

UNITED STATES PATENT AND TRADEMARK OFFICE
CERTIFICATE OF CORRECTION

Page 1 of 1

PATENT NO. : 11,120,392 B2
APPLICATION NO. : 16/437767
DATED : September 14, 2021
INVENTOR(S) : Drew Anthony Schena and Guohua Min It is certified that error appears in the above-identified patent and that said Letters Patent is hereby corrected as shown below:

In the Claims

Column 15, Line 44 (Claim 5):
Replace the word "that" with "than".

Column 17, Line 3 (Claim 16):
Replace the word "that" with "than".

Signed and Sealed this
Twenty-eighth Day of June, 2022

Katherine Kelly Vidal
*Director of the United States Patent and Trademark Office*